(12) United States Patent
Chang et al.

(10) Patent No.: US 9,053,279 B2
(45) Date of Patent: Jun. 9, 2015

(54) PATTERN MODIFICATION WITH A PREFERRED POSITION FUNCTION

(71) Applicant: Taiwan Semiconductor Manufacturing Company, Ltd., Hsin-Chu (TW)

(72) Inventors: Shih-Ming Chang, Zhubei (TW); Ken-Hsien Hsieh, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 14/059,210

(22) Filed: Oct. 21, 2013

(65) Prior Publication Data

US 2014/0264899 A1    Sep. 18, 2014

Related U.S. Application Data

(60) Provisional application No. 61/792,179, filed on Mar. 15, 2013, provisional application No. 61/785,302, filed on Mar. 14, 2013.

(51) Int. Cl.
*G06F 17/50* (2006.01)
*H01L 23/528* (2006.01)
*H01L 21/027* (2006.01)

(52) U.S. Cl.
CPC ........ *G06F 17/5072* (2013.01); *G06F 17/5068* (2013.01); *H01L 23/528* (2013.01); *G06F 17/5081* (2013.01); *H01L 21/027* (2013.01)

(58) Field of Classification Search
USPC .................................. 716/110, 119, 132, 135
See application file for complete search history.

(56) References Cited

U.S. PATENT DOCUMENTS

| | | | |
|---|---|---|---|
| 2008/0141208 A1* | 6/2008 | Hirota | 716/14 |
| 2009/0235215 A1* | 9/2009 | Lavin et al. | 716/5 |
| 2013/0130511 A1* | 5/2013 | Smayling et al. | 438/759 |
| 2013/0196517 A1* | 8/2013 | Tsujita et al. | 438/795 |

* cited by examiner

*Primary Examiner* — Paul Dinh
(74) *Attorney, Agent, or Firm* — Haynes and Boone, LLP

(57) ABSTRACT

A method for pattern modification for making an integrated circuit layout is disclosed. The method includes determining a feature within a pattern of the integrated circuit layout that can be rearranged; determining a range in which the feature can be repositioned; for the feature, determining a preferred position function that exhibits extreme values at preferable positions; and rearranging the position of the feature within the range to match an extreme value of the function.

20 Claims, 6 Drawing Sheets

PATTERN MODIFICATION WITH A PREFERRED POSITION FUNCTION

This patent claims the benefit of U.S. Ser. No. 61/792,179 filed Mar. 15, 2013 and U.S. Ser. No. 61/785,302 filed Mar. 14, 2013, the disclosures of which are hereby incorporated by reference.

BACKGROUND

Integrated circuits include complex circuitry formed through various features in a semiconductor substrate. To design such circuits, the desired functionality is transformed into a design layout, in which each feature within the circuit for a particular layout is laid out so that the desired functionality may be achieved. In some cases, there is flexibility regarding the positioning of various features within the layout.

For example, some photolithographic techniques involve the use of both a main pattern and a cut pattern to form a target pattern. The cut pattern removes portions of features formed by the main pattern in order to achieve the desired target pattern. For example, cut patterns can be used to split main patterns into smaller features to create the desired patterns. Using such techniques provides certain advantages to the photolithographic process. For example, it is desirable to have a large process window. The process window refers to the range of focus and exposure settings that will still produce the desired features into the photo-resist layer. A process window can be improved by keeping features within a pattern to be uniform in density. This may involve placement of "dummy" features. Dummy features are extra features that are placed within the main pattern in order to maintain feature density but do not serve any function within the circuit for which the pattern is designed. Cut features can also be used to separate dummy features from functional features. However, in some cases the cut features may be repositioned within a particular range and the circuitry will still function as desired.

In a further example, vias are often used to connect a metal feature from a first metal layer to a metal feature from a second metal layer. In some cases, the vias must be placed at a precise location in order to make the desired connection. In other cases, however, the vias may move within a defined region and still make the desired connection between metal layers.

It can be beneficial to consider the placement of certain features of certain patterns for energy efficient purposes. Specifically, the placement of certain features, such as vias in a via pattern or cut features in a cut pattern, can have an effect on the efficiency of forming those patterns. Thus, it is desirable to have methods for determining optimal placement of such features.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1A:
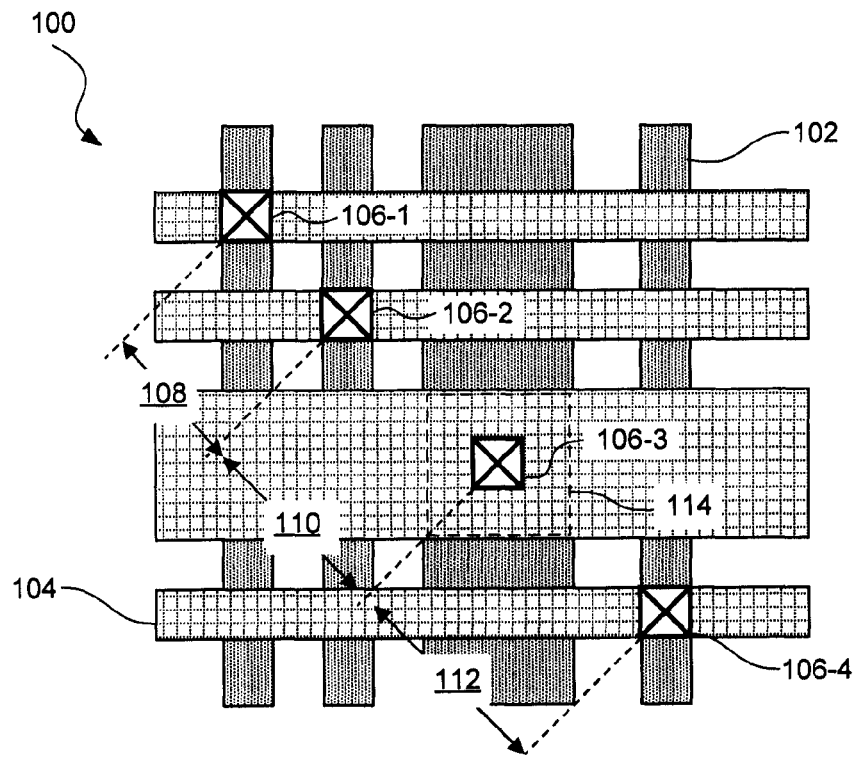
FIG. 1A is a diagram showing an illustrative top view of a via pattern with respect to other patterns, according to one example of principles described herein.

FIG. 1A is a diagram showing an illustrative top view 100 of a via pattern with respect to other patterns. Vias 106 are often used to connect metal features from one metal layer 102 to metal features of a different metal layer 104. In some cases, a via 106 is limited by the overlap of the metal layers. For example, vias 106-1, 106-2, and 106-4 are limited in their placement because the underlying metal features are as narrow as the via itself.

In some cases, a via 106-3 may have a range 114 in which it can be repositioned without adversely affecting the function of the circuit for which the pattern is designed. Specifically, the via 106-3 may be repositioned within the region 114 and still maintain a sufficient electrical connection between the first metal layer 102 and the second metal layer 104. Thus, if a repositioning of the via 106-3 would be beneficial, it would be useful to reposition the via 106-3 accordingly.

As illustrated, the distances 108, 110, 112 between the vias 106 vary. In some examples, it may be useful to move the vias so that the distances between each of the vias is an integer multiple of a single distance. This can be useful when exposing the via layer through a photo-mask. Specifically, if the features within the photo-mask are all an integer multiple of a specific distance, then the process window can be increased. Thus, there can be more tolerance in the focus and exposure settings of the photolithography tool used to expose a photo-resist layer through the photo-mask.

A function can be defined to relate the position of features with an index and the function can be used to determine the position of features, such as by minimizing the index. Thus, the function may be referred to as a preferred position function. The preferred position function can be designed for a variety of situations as will be discussed in further detail below. In this example, the preferred position function indicates that features (i.e., vias) should be repositioned so that they are within distances from each other that are an integer multiple of a specified distance.

As a comparison for better understanding, the preferred position function is similar to a potential energy function of a physics system. The physics system is stable when the potential energy is minimized. In the present disclosure, the position of features is optimized when the preferred position function is minimized. The index is comparable to the potential energy. The method to reposition various features in an integrated circuit layout using the preferred position function is described in detail according to various embodiments.

Figure 1B:
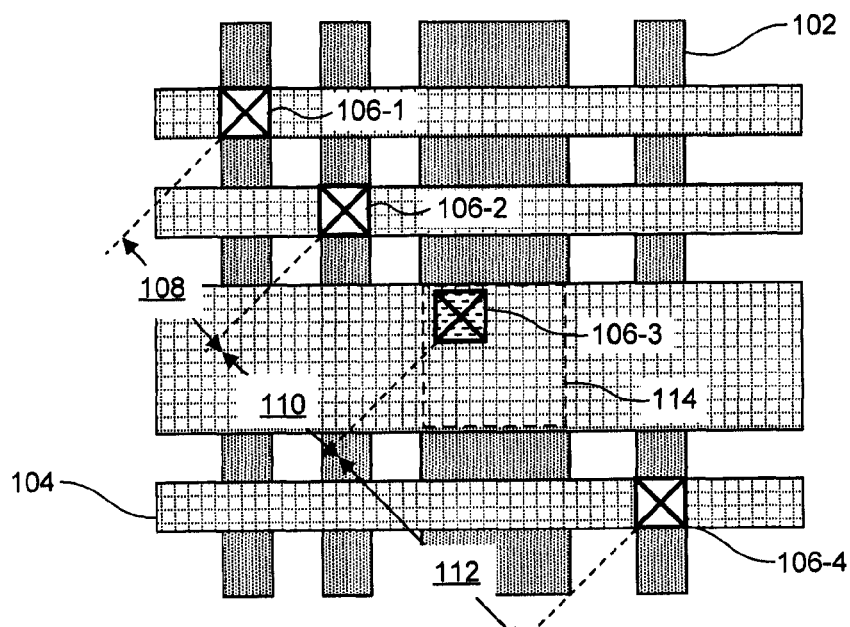
FIG. 1B is a diagram showing an illustrative adjustment of via position to optimize layout for efficiency purposes, according to one example of principles described herein.

FIG. 1B is a diagram showing an illustrative adjustment of via position to optimize layout for efficiency purposes. According to the present example, the distance 108 between the first via 106-1 and the second via 106-2 represents the specified distance. Because the third via 106-3 has been repositioned according to the preferred position function, the distance 110 between the second via 106-2 and the third via 106-3 is the same as the specified distance. Additionally, the distance 112 between the third via 106-3 and the fourth via 106-4 is twice the specified distance, and thus an integer multiple of the specified distance. In some cases, this specified distance may be the minimum pitch defined by design specifications.

Figure 2A:
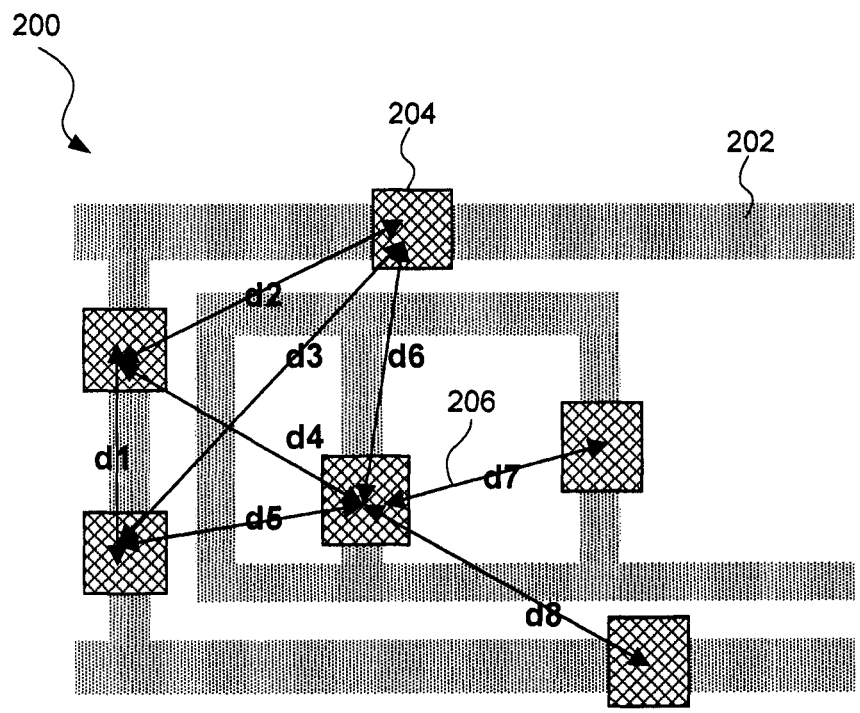
FIG. 2A is a diagram showing an illustrative cut pattern with respect to a main pattern, according to one example of principles described herein.

FIG. 2A is a diagram showing an illustrative cut pattern 200 with respect to a main pattern 202. According to certain illustrative examples, a preferred position function can be used to reposition cut features 204 with respect to a main pattern 202. In some cases, a pattern layout may be formed by using a main pattern 202 and a cut pattern 200. The main pattern 202 is designed to be formed for better lithography performance, such as a larger process window, a longer depth of focus, or a higher contrast. Thus, the main feature 202 may include extra features, referred to as redundancy features. Moreover, the main pattern 202 may connect lines that are not intended to be connected. To sever these lines, or separate redundancy features from functional features, a cut pattern 200 is used. The cut pattern 200 includes a number of cut features 204 that "cut" the features formed by the main pattern.

The cut features 204 may have a range along the main pattern 202 in which they can be repositioned without adversely affecting the desired circuit functionality. Thus, a preferred position function may be used to determine how to reposition the cut features 204 in a preferable manner. This may be done within the constraints of the ranges in which they may be moved.

Figure 2B:
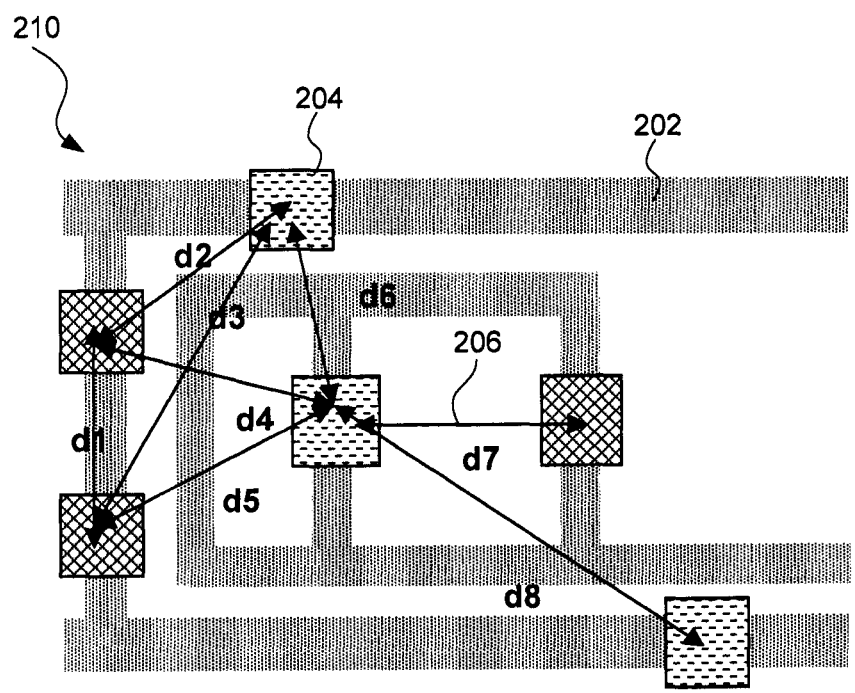
FIG. 2B is a diagram showing an illustrative adjustment of cut features within the cut pattern to optimize the layout for efficiency purposes, according to one example of principles described herein.

FIG. 2B is a diagram showing an illustrative adjustment 210 of cut features within the cut pattern to optimize the layout for efficiency purposes. According to the present example, the cut features 204 have been repositioned so that distances 206 between them are an integer multiple of a specified distance. The following table provides an example of the distances between features before and after repositioning according to the preferred position function. The specified distance is defined as SD.

TABLE 1

| Distance | Before Reposition | After Reposition |
| --- | --- | --- |
| D1 | SD | SD |
| D2 | 1.4 * SD | 1.0 * SD |
| D3 | 2.6 * SD | 2.2 * SD |
| D4 | 1.4 * SD | 1.1 * SD |
| D5 | 1.2 * SD | 1.1 * SD |
| D6 | 1.2 * SD | 1.0 * SD |
| D7 | 1.2 * SD | 1.1 * SD |
| D8 | 1.6 * SD | 2.0 * SD |

According to the present example, the distances between cut features 204 after repositioning are close to an integer multiple of the specified distance. In some cases, it may not be possible to move every feature to a precise integer multiple. Thus, a tolerance level may be defined. For example, a tolerance level of 5%, 7%, 10%, 15%, or 20% may be used. Other tolerance levels may be used as well. In the present example, a tolerance level of 10% is used. Thus, it is acceptable if a distance is within 9.9-1.1, 1.8-2.2, or 2.7-3.3 times the specified distance.

A device formed using principles described herein will have specific unique characteristics. Specifically, forming a semiconductor circuit with main patterns and cut patterns causes the features within the circuitry to have certain characteristics. For example, various line ends will have edges that indicate they were formed with a cut feature. Moreover, each of the cut feature locations will have distances from each other that are close to an integer multiple of a specified distance. In some cases, the specified distance may be the minimum pitch for the layer of the pattern formed with the cut features.

Figure 3A:
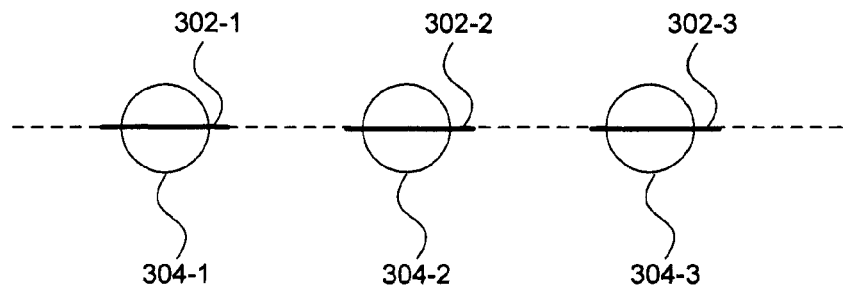
FIGS. 3A-3B are diagrams showing an illustrative adjustment of features within a defined range, according to one example of principles described herein.
Figure 3B:
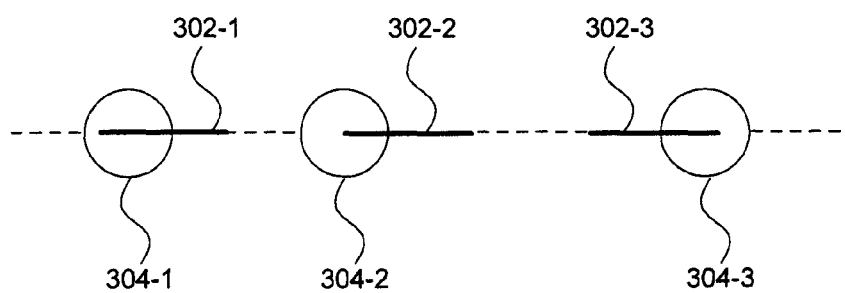

FIGS. 3A-3B are diagrams showing an illustrative adjustment of features within a defined range. FIG. 3A illustrates a number of features 304. Each feature can be repositioned along a range 302. In this example, the range 302 is a straight line. Thus, the features 304 can only move in a single direction.

Figure 4:
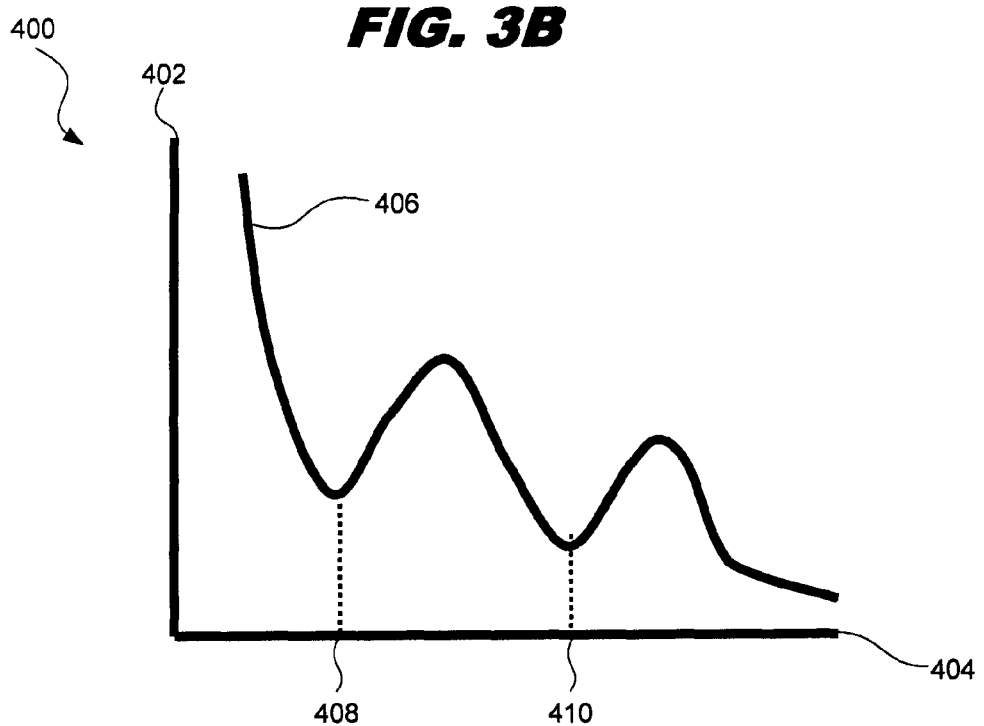
FIG. 4 is a graph showing an illustrative function that relates position of features to efficiency of forming the features, according to one example of principles described herein.

FIG. 3B illustrates the features 304 after they have been repositioned according to a preferred position function (such as the preferred position function in FIG. 4). Specifically, the first feature 304-1 has been moved to the left. Additionally, the second feature 304-2 has been moved to the left. The distance between the first feature 304-1 and the second feature 304-2 represents the specified distance and remains the same through the repositioning. The third feature 304-3, however, has been moved in the opposite direction. The distance between the second feature 304-2 and the third feature 304-3 is now twice the specified distance. Thus, these features can be formed lower potential energy by the photolithography system.

FIG. 4 is a graph 400 showing an illustrative preferred position function that relates position of features to the preferable nature of those positions. According to the present example, the horizontal axis 404 represents distance from a particular feature, with zero being the complete overlap of two features. The vertical axis 402 represents a value that indicates the preferable nature of the position. This will be referred to as the preference value.

In one example, the preferable nature may be modeled using a potential energy function. The preferable nature may be associated with the lowest potential energy. Thus, a lower value indicates a more preferable position. In this case, the preferred position function 406 includes two low points. The low points are extreme values along the function. Each extreme value corresponds to an integer multiple of a specific distance because this function is designed to indicate the preferable nature of placing features within distances from each other that are integer multiples of a specified distance. Thus, both the first point 408 and the second point 410 represent distances at which placement of a feature is preferred.

Using the features of FIG. 3 as an example, the distance between the first feature 304-1 and the second feature 304-2 may correspond to the first point 408 on the graph 400. Specifically, the position of the first feature 304-1 corresponds to zero on the horizontal axis 404 and the second feature 304-2 corresponds to the first point 408. The distance between the second feature 304-2 and the third feature 304-3 may correspond to the second point 410 on the graph 400. Specifically, the position of the second feature 304-2 corresponds to zero on the horizontal axis 404 and the third feature 304-3 corresponds to the second point 410.

The preferred position function may be derived for a variety of situations. In some examples, the preferred position function may be directly defined in a mathematic formula. In other cases, the function may be expressed in a curve as illustrated in FIG. 4. The preferred position function can be constructed according to various rules and factors, which may be extracted from the manufacturing data. For example, one factor is the minimum pitch for a particular pattern. In another example where a forbidden zone is defined to present a minimum distance between features, the corresponding preferred position function goes substantially high or infinite when the distance approaches the minimum distance. In some examples, the preferred position function may relate preferable positions to a two dimensional pattern. Thus, the preference value of a single point will be a function of a position in an x-direction and a position in a y-direction. The preferred position function may factor in a variety of characteristics. In some cases, the preferred position function may factor in the characteristics of the features themselves. For example, if the features are round, then the ideal distance between features may be different than if the features were square. Moreover, the preferred position function may factor the distances between other types of features in addition to similar types of features.

Figure 5:
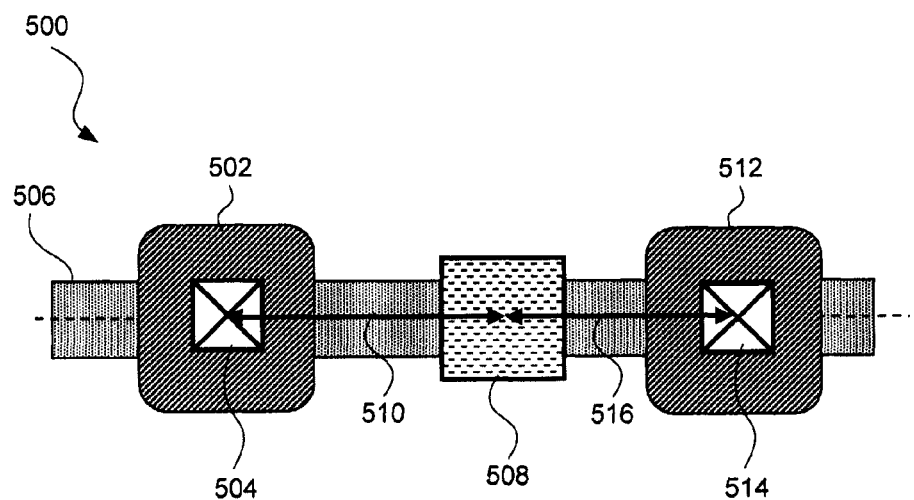
FIG. 5 is a diagram showing an illustrative placement of a cut feature with respect to a via, according to one example of principles described herein.

FIG. 5 is a diagram showing an illustrative placement 500 of a cut feature 508 with respect to vias 504, 514. One example of a case where the preferred position function may factor in the position of another type of feature is the case where a cut feature 508 is positioned based on the location of vias 504, 514. In general, it is preferable to have cut features as far away from vias as possible. Thus, a customized preferred position function can be designed to do so.

For example, a cut feature 508 may be positioned along a main feature 506 between two vias 504, 514. Each via may have a keep-out zone 502, 512 associated with it. The keep-out zone 502, 512 represents a region where the cut feature must not be placed. It may be possible for the cut feature 508 to be placed anywhere between the two keep-out zones 502, 512 without touching them.

In some examples, the preferred position function for each via 504, 514 may be different. Thus, the ideal location of the cut feature 508 may not be in the precise middle between the two vias 504, 514. Specifically, the distance 510 between the cut feature 508 and the first via 504 may be different than the distance 516 between the cut feature 508 and the second via 514.

Figure 6:
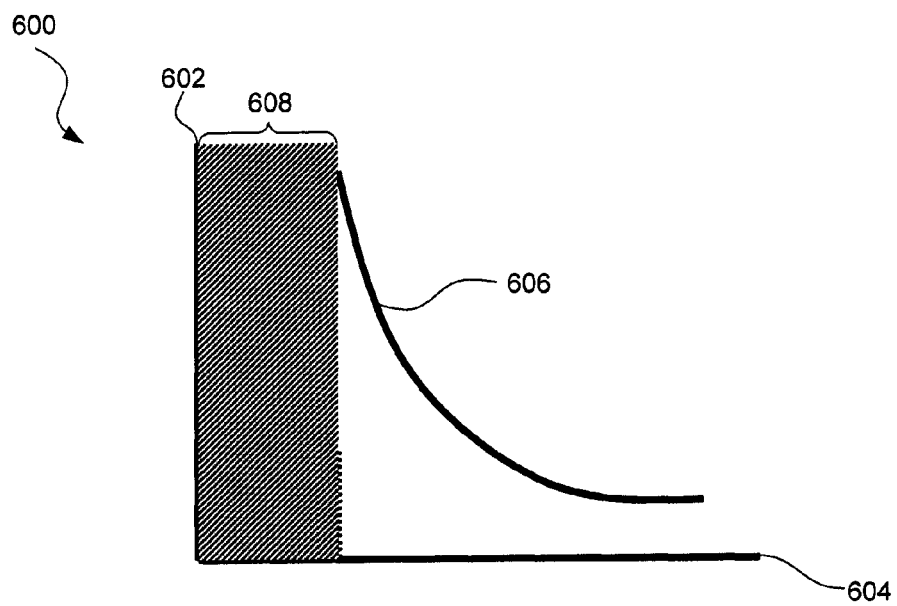
FIG. 6 is a graph showing an illustrative function that relates position of a cut feature with respect to a via to efficiency of forming the cut feature, according to one example of principles described herein.

FIG. 6 is a graph showing an illustrative preferred position function that relates position of a cut feature with respect to a via to efficiency of forming the cut feature. According to the present example, the horizontal axis 604 represents distance from a particular feature, with zero being the complete overlap of two features. The vertical axis 602 represents the preference value. Again, the preferred position function is based on a potential energy function. Thus, the lower the preference value, the more tendentious to place a feature at that distance will be.

From zero to a certain point, the graph 600 indicates the keep-out zone 608. Thus, the cut feature cannot be positioned anywhere within this distance. As the distance from zero increases, the preference value goes lower. Thus, it is more desirable to put the cut feature farther from the via than closer.

In other example, the preferred position function includes a plurality variables associated with the positions of a plurality of features, respectively. By minimizing the preferred position function, the features are repositioned.

Figure 7:
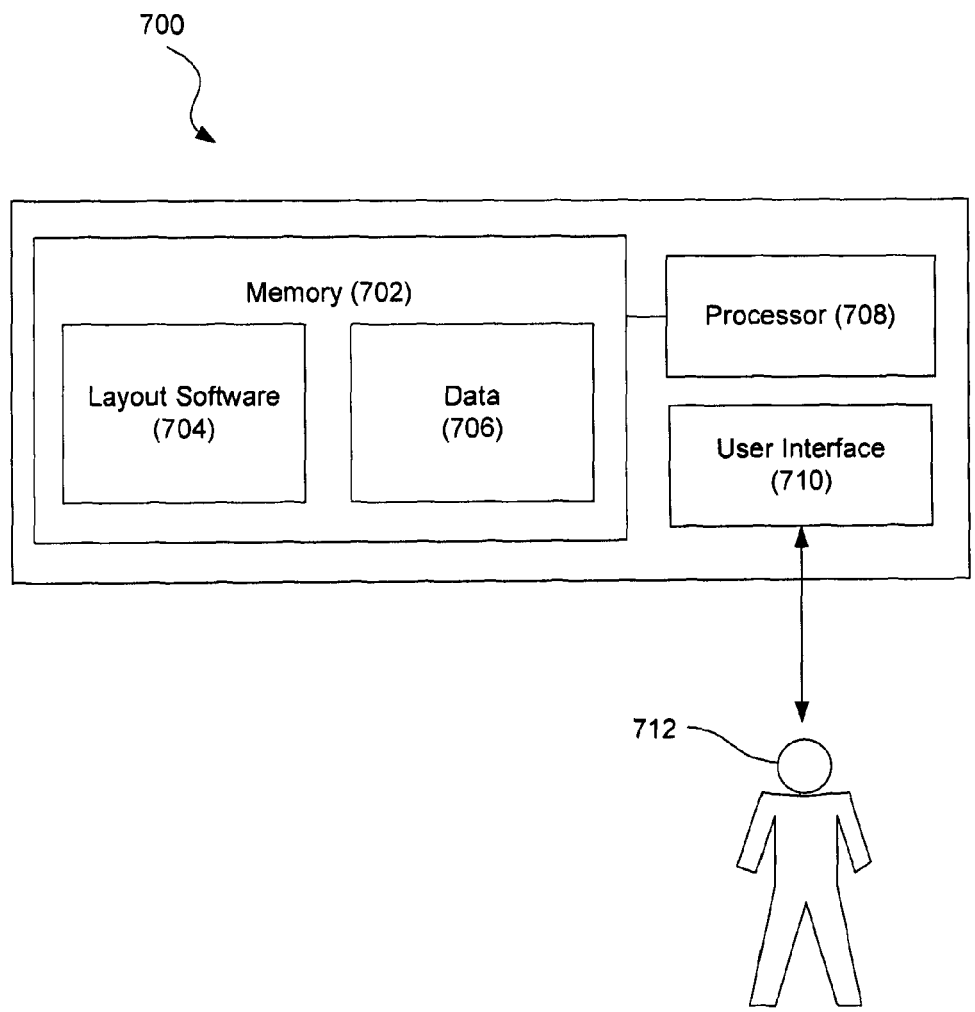
FIG. 7 is a diagram showing an illustrative computing system that may be used to optimize a main pattern and a cut pattern, according to one example of principles described herein.

FIG. 7 is a diagram showing an illustrative computing system that may be used to optimize a main pattern and a cut pattern. According to certain illustrative examples, the physical computing system 700 includes a memory 702 having modeling software 704 and data 706 stored thereon. The physical computing system 700 also includes a processor 708 and a user interface 710.

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software 704 and data 706.

The physical computing system 700 also includes a processor 708 for executing the software 704 and using or updating the data 706 stored in memory 702. In addition to storing the modeling software 704, the memory 702 may store an operating system. An operating system allows other applications to interact properly with the hardware of the physical computing system. The layout software 704 may include the tools to form final pattern layouts as well as main pattern layouts and cut pattern layouts.

A user interface 710 may provide a means for a user 712 to interact with the system. The user may use various tools such as a keyboard or a mouse to input information into the physical computing system. Additionally, various output devices such as a monitor may be used to provide information to the user 712.

Figure 8:
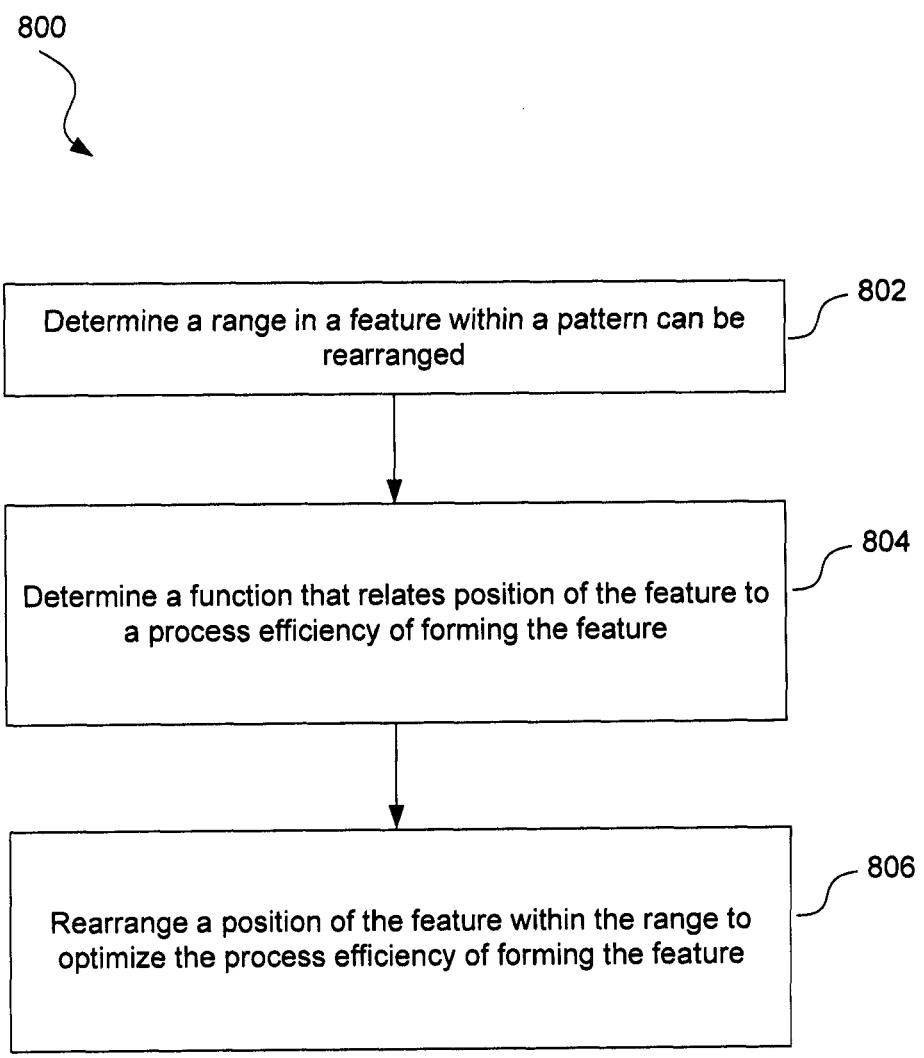
FIG. 8 is a flowchart showing an illustrative method for optimizing positions of features within a pattern, according to one example of principles described herein.

FIG. 8 is a flowchart showing an illustrative method for optimizing features within pattern. According to certain illustrative examples, the method includes a step for determining 802 a range in a feature within a pattern can be rearranged. At this step, each feature is determined to have an allowable position range.

The method further includes a step for determining 804 a function that relates position of the feature to a process efficiency of forming the feature. In the present embodiment, the function (the preferred position function) is determined based on the range of a feature. The function may be determined additionally based on other factors. For example, each extreme value in the function corresponds to an integer multiple of a specific distance that indicates the preferable nature of placing features within distances from each other that are integer multiples of a specified distance.

The method further includes a step for rearranging 806 a position of the feature within the range to optimize the process efficiency of forming the feature. At this step, by minimizing the function, the preferred position of the feature is determined. Accordingly, the feature is rearranged to the preferred position.

According to certain illustrative examples, a method for pattern modification includes determining a range in a feature within a pattern can be rearranged, determining a function that relates position of the feature to a process efficiency of forming the feature, and rearranging a position of the feature within the range to optimize the process efficiency of forming the feature.

According to certain illustrative examples, a computing system for pattern optimization includes a processor and a memory. The memory includes computer readable instructions that when executed by the processor, cause the processor to determine ranges in which features within a pattern can be rearranged, determine a function that relates position of the features to a process efficiency of forming the features, and rearrange positions of the feature within the ranges to optimize the process efficiency of forming the features.

According to certain illustrative examples, a device includes circuitry having layers formed through main patterns and corresponding cut patterns. The cut features of the cut pattern are positioned such that each cut feature is within a defined tolerance range of integer multiples of a minimum distance from other cut features.

It is understood that various different combinations of the above-listed embodiments and steps can be used in various sequences or in parallel, and there is no particular step that is critical or required. Additionally, although the term ¡§electrode¡¨ is used herein, it will be recognized that the term includes the concept of an ¡§electrode contact.¡¨ Furthermore, features illustrated and discussed above with respect to some embodiments can be combined with features illustrated and discussed above with respect to other embodiments. Accordingly, all such modifications are intended to be included within the scope of this invention.

The foregoing has outlined features of several embodiments. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A method for pattern modification for making an integrated circuit layout, the method comprising:
    identifying a set of features within a pattern of the integrated circuit layout, the set of features including a first feature that is at a first distance from a second feature of the set of features;
    determining a range over which the first feature is repositionable according to a functional constraint;
    for the set of features, determining a specified distance; and
    repositioning the first feature within the range to a new position that is at a second distance from the second feature, the second distance being closer to an integer multiple of the specified distance than the first distance.

2. The method of claim 1, further comprising, determining additional ranges over which additional features within the pattern are repositionable.

3. The method of claim 2, further comprising, repositioning the additional features such that each of additional features are at distances from other features that are closer to an integer multiple of the specified distance.

4. The method of claim 3, wherein the features are positioned such that the distances between the features are within a tolerance range of integer multiples of the specified distance.

5. The method of claim 4, wherein the tolerance range is about 10 percent.

6. The method of claim 3, wherein the distances from other features are along lines in multiple directions.

7. The method of claim 1, wherein the specified distance is the minimum pitch of the pattern.

8. The method of claim 1, wherein the range is one of: along a line or within a defined two dimensional region.

9. The method of claim 1, wherein the feature comprises a cut feature within a cut pattern.

10. The method of claim 1, wherein the feature comprises a via used to connect a metal feature of a first metal layer with a metal feature of a second metal layer.

11. A computing system for optimizing a pattern of an integrated circuit layout, the system comprising:
    a processor;
    a memory comprising computer readable instructions that when executed by the processor, cause the processor to:
        determine a set of features within a pattern that are repositionable according to a functional constraint;
        determine a range for each feature of the set of features over which the features are repositionable;
        for the set of features, determine a specified distance; and
        reposition the features within the ranges such that the features are closer to an integer multiple of the specified distance.

12. The system of claim 11, wherein the features are repositioned such that distances between the features are within a tolerance range of integer multiples of the specified distance.

13. The system of claim 12, wherein the specified distance is the minimum pitch of the pattern.

14. The system of claim 12, wherein the tolerance range is about 5 percent.

15. The system of claim 11, wherein the range for one of the features is along a line.

16. The system of claim 11, wherein the range for one of the features is within a defined two dimensional region.

17. The system of claim 11, wherein the features comprise one of: cut features within a cut pattern and vias.

18. A method for pattern modification, the method comprising:
- identifying a plurality of features within a pattern of an integrated circuit layout, the plurality of features being positioned at a first set of distances from each other, the first set of distances being varied, the first set of distances being along lines in varying directions;
- determining a range over which each of the plurality of features is repositionable according to a functional constraint;
- for the plurality of features, determining a specified distance, the specified distance corresponding to a minimum pitch; and
- repositioning the plurality of features such that the plurality of features are at a second set of distances from each other, the distances within the second set of distances being closer to an integer multiple of the specified distance.

19. The method of claim 18, wherein the plurality of features comprise cut features, and the functional constraint limits positions of the cut features to a position along a main pattern.

20. The method of claim 18, wherein the plurality of features comprise vias, and the functional constraint limits positions of the features to where overlying and underlying conductive structures overlap.

* * * * *